United States Patent
Costanza et al.

(10) Patent No.: US 7,885,203 B2
(45) Date of Patent: Feb. 8, 2011

(54) APPARATUS AND METHOD FOR INTRA-CELL DELAY TIME ANALYSIS

(75) Inventors: Joe R. Costanza, Monument, CO (US); Vonn Leland Black, Colorado Springs, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1861 days.

(21) Appl. No.: 10/631,426

(22) Filed: Jul. 31, 2003

(65) Prior Publication Data

US 2005/0025062 A1 Feb. 3, 2005

(51) Int. Cl.
G01R 31/00 (2006.01)
H04L 12/54 (2006.01)

(52) U.S. Cl. .................. 370/253; 370/395.21

(58) Field of Classification Search .......... 370/230, 370/229, 395.21, 252, 253, 235–240, 395.41
See application file for complete search history.

(56) References Cited

U.S. PATENT DOCUMENTS

| | | | |
|---|---|---|---|
| 5,802,041 A * | 9/1998 | Waclawsky et al. ......... 370/245 |
| 6,600,702 B2 * | 7/2003 | Sato et al. ................ 369/30.68 |
| 6,671,278 B1 * | 12/2003 | McBride et al. ........ 370/395.41 |
| 6,907,003 B1 * | 6/2005 | Gvozdanovic .............. 370/232 |
| 7,149,185 B1 * | 12/2006 | Suni ........................... 370/230 |
| 7,190,669 B2 * | 3/2007 | Banerjee .................... 370/229 |
| 2004/0058652 A1 * | 3/2004 | McGregor et al. ....... 455/67.13 |
| 2004/0233912 A1 * | 11/2004 | Droz et al. ............ 370/395.21 |

FOREIGN PATENT DOCUMENTS

JP     20013203693     7/2001

OTHER PUBLICATIONS

Japanese Patent and Trademark Office, office action dated Nov. 11, 2009.

* cited by examiner

*Primary Examiner*—Seema S Rao
*Assistant Examiner*—Mon Cheri S Davenport
(74) *Attorney, Agent, or Firm*—Volentine & Whitt, PLLC (57) ABSTRACT

Method and apparatus for analyzing intra-cell delay times. The delay time between cells is measured and the number of times the measured delay times equals each of a plurality of predefined values is calculated. A graph is displayed indicating the count for each of the plurality of predefined values.

13 Claims, 6 Drawing Sheets

APPARATUS AND METHOD FOR INTRA-CELL DELAY TIME ANALYSIS

BACKGROUND OF THE INVENTION

Asynchronous Transfer Mode (ATM) is the world's most widely deployed backbone technology. This standards-based transport medium is widely used within the core, at the access points, and in the edge of telecommunications systems to send data, video and voice at ultra high speeds.

ATM is a connection-oriented transfer mode that transmits user data in units called cells. Before sending cells a virtual connection between source and destination has to be established. The virtual connection is described in terms of Virtual Paths (VP) and Virtual Channels (VC). Basically a single VP has multiple VCs. All the cells of a connection follow the same path within the network. During the connection setup each switch on the path generates an entry in the Virtual Path Identifier (VPI)/Virtual Channel Identifier (VCI) translation table. This enables the switch to move an incoming packet from its VP/VC to corresponding outgoing VP/VC.

ATM Networks are able to transmit data with varying characteristics depending on the Quality of Service (QoS) desired. Different applications need different QoS. Some applications like telephony may be very sensitive to delay, but rather insensitive to loss, whereas others like compressed video are quite sensitive to loss. ATM specifies several Quality of Service (QoS) categories: CBR (Constant Bit Rate); rt-VBR (real-time Variable Bit Rate); nrt-VBR (non-real-time Variable Bit Rate); ABR (Available Bit Rate); and UBR (Unspecified Bit Rate).

A CBR connection reserves a constant amount of bandwidth during a connection setup. The source is allowed to send at the negotiated rate any time and for any duration. It may temporarily send at a lower rate as well. Applications that require small delay variations (jitter), such as voice, video and circuit emulation benefit from a CBR connection.

VBR negotiates a Peak Cell Rate (PCR), a Cell Delay Variation Tolerance (CDVT), a Sustainable Cell Rate (SCR) and a Maximum Burst Size (MBS) or Intrinsic Burst Tolerance (IBT). Sources that do well with VBR tend to be bursty such as compressed voice and video. Such applications can withstand larger delay variations (jitter). VBR service is further divided in real-time VBR (rt-VBR) and non-real-time VBR (nrt-VBR). They are distinguished by the need for an upper bound delay (Max CTD). MaxCTD is provided by rt-VBR, whereas for nrt-VBR no delay bounds are applicable.

ABR and UBR services use the remaining bandwidth, which is dynamic based on the bandwidth used by the CBT and VBR services. ABR and UBR transfer data that do not require tight constraints on end-to-end delay and delay variation. Typical applications are computer communications, such as file transfers and e-mail. UBR service provides no feedback mechanism, meaning that if the network is congested, UBR cells may be lost. An ABR source gets feedback from the network. The network provides information about the available bandwidth and the state of congestion. The source's transmission rate is adjusted based on the feedback information. This more efficient use of bandwidth alleviates congestion and cell loss. For ABR service, a guaranteed minimum bandwidth (MCR) is negotiated during the connection setup negotiations.

When a request for connection to the network is submitted, the request includes a description of the proposed traffic (traffic parameters) and the desired service (QoS parameters). The network performs admission control to determine if sufficient resources are available to satisfy the proposed QoS without violating the QoS of existing connections. Assuming that both conditions can be met, the network accepts the request.

Traffic parameters describe inherent characteristics of a traffic source. Traffic parameters include: Peak Cell Rate (PCR) which is an upper bound for cell rate; Sustained Cell Rate (SCR): which is the average cell rate measured over some long interval; Cell Delay Variation Tolerance (CDVT) which describes the maximum burst size that can be sent at the MaxCR; Maximum Burst Size (MBS) which is the maximum burst size that can be sent at the peak rate; and Minimum Cell Rate (MCR) which is the minimum cell rate a user is allowed to send.

ATM QoS parameters characterize performance of an ATM layer connection. QoS parameters include: Max Cell Transfer Delay (CTD) which is the delay experienced by a cell between network entrance and exit points; peak-to-peak Cell Delay Variation (CDV) which is the max-min cell transfer delay; Maximum Cell Rate (MaxCR) which is the maximum capacity usable by connections belonging to the specified service category; and Cell Loss Ratio (CLR) which is the percentage of cells that can be lost.

The network performs policing and shaping at the network entrance to ensure that the user's data flow adheres to the agreed upon specification. ATM's conformance definition defines conformity at an interface with respect to traffic contracts according to one or more instances of the Generic Cell Rate Algorithm (GCRA). The GCRA is often referred to as the "leaky bucket." The GCRA allows the passing of cells so long as there is space in the "bucket" to accept the cells. The "bucket" leaks cells onto the network at a specified rate, thereby creating more space for accepting additional cells. Any cells that arrive at the bucket when it is full are discarded.

Mathematically, the GCRA is defined using Equation 1:

$$GCRA(T, \tau) \quad \text{EQUATION 1}$$
$$t : \text{cell arrival time}$$
$$tat : \text{theoretical arrival time}$$
$$\text{if}(t < tat - \tau)$$
$$\quad \text{cell nonconforming}$$
$$\text{else}$$
$$\quad \text{cell conforming}$$
$$tat = \max(t, tat) + T$$

GCRA(T, τ) works as follows: For every new cell the arrival time is compared to the Theoretical Arrival Time (TAT). If the cell is late (i.e. the cell rate is lower than its nominal rate), it is accepted by the ATM network. If the cell is early a check is made to make sure that the deviation is within the tolerable limit, if so, the cell is accepted by the ATM network otherwise the cell is discarded.

The GCRA is used to define, in an operational manner, the relationship between Peak Cell Rate (PCR) and Cell Delay Variation Tolerance (CDVT) and the relationship between Sustained Cell Rate (SCR) and Burst Tolerance (BT). The CDVT is defined in relation to the Peak Cell Rate but is not a traffic descriptor (i.e. cannot be specified by the user). There is actually an assumption that PCR sources strictly conform to the PCR rate (i.e. GCRA(T, τ)) and that CDVs are added by local and/or public ATM switches.

Testing network traffic against a GCRA may reveal whether the traffic exceeds a contract and the number of cells that are in excess for either part of the contract (PCR or SCR). It is important to note that simply testing traffic against a GCRA qualifies whether the traffic complies, but does not "quantify" the traffic or indicate how close it is to complying (or not complying). If use of the GCRA is the only testing performed, the ideal contract parameters must of necessity be established by trial and error.

A variety of network test systems, such as the AGILENT TECHNOLOGIES J6800 series of Network Analyzers and the E4334A Broadband Series Test System, have evolved to provide full and uniform testing of ATM networks with high level performance measurement and protocol analysis. One of the key measurements taken by known network testing systems is the Cell Delay Variation measurement as defined by the GCRA. Such a measurement provides an indication of the level of jitter from a specified cell arrival time. However, the Cell Delay Variation measurement is only useful for CBR applications. By definition, the CDV measurement is in reference to the negotiated peak cell rate without regard to burst tolerance or sustained cell rate. VBR applications rely on a relatively high PCR and a lower SCR while CBR applications need only a single rate, the PCR (since their bit rate is supposed to be constant). Thus, known CDV measurements center around a specific cell rate. The variance measurement is based on the time delta around that specific cell rate. In a VBR connection there can be several cell rates that are of interest.

The present inventors have recognized a need for apparatus and methods for quantifying and presenting cell arrival times that allow a user to quickly identify and manage contract parameters for constant-bit-rate-traffic and variable-bit-rate traffic.

BRIEF DESCRIPTION OF THE DRAWINGS

An understanding of the present invention can be gained from the following detailed description of the invention, taken in conjunction with the accompanying drawings of which.

DETAILED DESCRIPTION

Reference will now be made in detail to the present invention, examples of which are illustrated in the accompanying drawings, wherein like reference numerals refer to like elements throughout. The detailed description which follows presents methods that may be embodied by routines and symbolic representations of operations of data bits within a computer readable medium, digital logic circuits, associated processors, embedded systems, general purpose personal computers configured with data acquisition cards and the like. The methods presented herein may be embodied by sequences of steps or actions implemented by digital logic or a processor leading to a desired result, and as such, encompasses such terms of art as "software," "hardware," "firmware," "microcode," "routines," "programs," "objects," "functions," "subroutines," "circuits," and "procedures." These descriptions and representations set forth herein are the means used by those skilled in the art effectively convey the substance of their work to others skilled in the art.

The methods of the present invention will be described with respect to implementation on an AGILENT TECHNOLOGIES test and measurement systems, such as the AGILENT TECHNOLOGIES J6800 series of Network Analyzers and the E4334A Broadband Series Test System. Those of ordinary skill in the art will recognize that the methods recited herein may be implemented on a variety of test and measurement hardware, general-purpose computers and any combination thereof. More to the point, the methods presented herein are not inherently related to any particular device or operating system. Rather, various devices and operating systems may be used in accordance with the teachings herein. Machines that may perform the functions of the present invention include those manufactured by such companies as AGILENT TECHNOLOGIES, INC., HEWLETT PACKARD and TEKTRONIX as well as other manufacturers of test and measurement systems and general computing devices.

Figure 1:
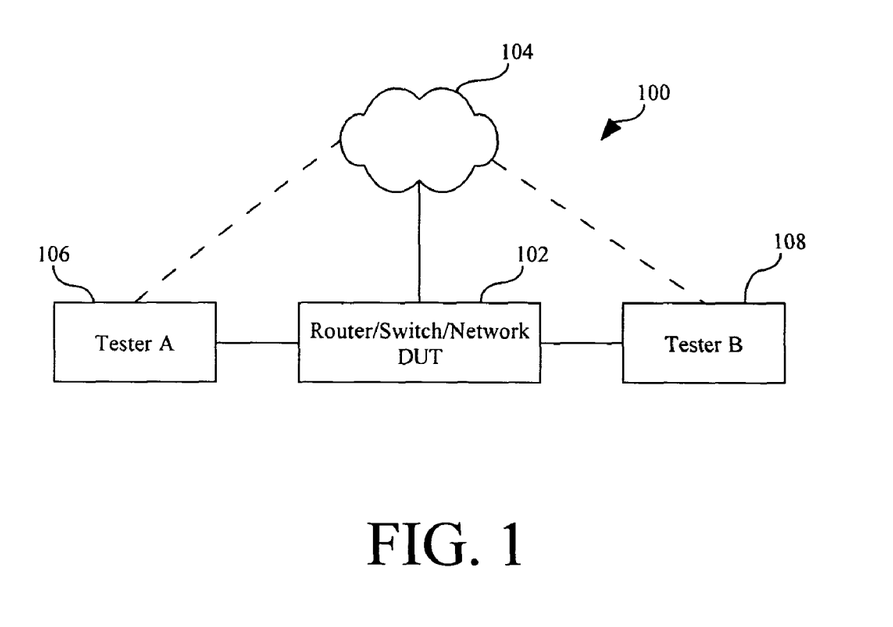
FIG. 1 is a block diagram of a test and measurement system in accordance with an embodiment of the present invention.

FIG. 1 is a block diagram of a test and measurement system 100 in accordance with an embodiment of the present invention. In FIG. 1 a router, switch, network or other device under test (DUT) is shown connected to a network 104 such as a WAN or the Internet. The DUT can be any component or combination of components on the network and/or any path or combination of paths through the network. A test and measurement system 106, the tester A, is connected to at least one port of the switch 102. While FIG. 1 implies that the connection is a direct physical connection that need not be the case. In fact the tester A, can be connected to the switch 102 via the network 104. Optionally, a second test and measurement system 108, the tester B, is connected to at least one other port of the switch 102. Once again, while FIG. 1 implies that the connection is a direct physical connection that need not be the case.

By way of example, the Tester A can take the form of an Agilent Technologies, Inc. J6800A Network Analyzer with the appropriate Line Interface Module for connecting to the network on which the DUT is located. Alternatively, the Tester A could comprise an Agilent Technologies, Inc. E4200 Broadband Series Test System. While perhaps preferable, a dedicated tester is not required to practice the present invention. Any general-purpose computer can be configured, with the addition of an appropriate network interface card, to perform the measurements of the present invention. Such a general-purpose computer can be optionally configured with the Agilent Technologies, Inc. J6840A Network Analyzer Software that provides a suitable platform for implementation of the present invention.

To measure and quantify actual traffic only one tester is usually required. To test the limits of a system, such as for validating the policing function of an ATM switch, a source of controlled test traffic is needed. This can be provided by Tester B, which can for example take the form of an Agilent Technologies, Inc. E4200 Broadband Series Test System operating in transmit mode. Alternatively, an Agilent Technologies, Inc. Router Tester can provide test traffic in the case that an ATM network may be equipped with an E7307A 622 Mb/s Q/A Robot Card.

Figure 2:
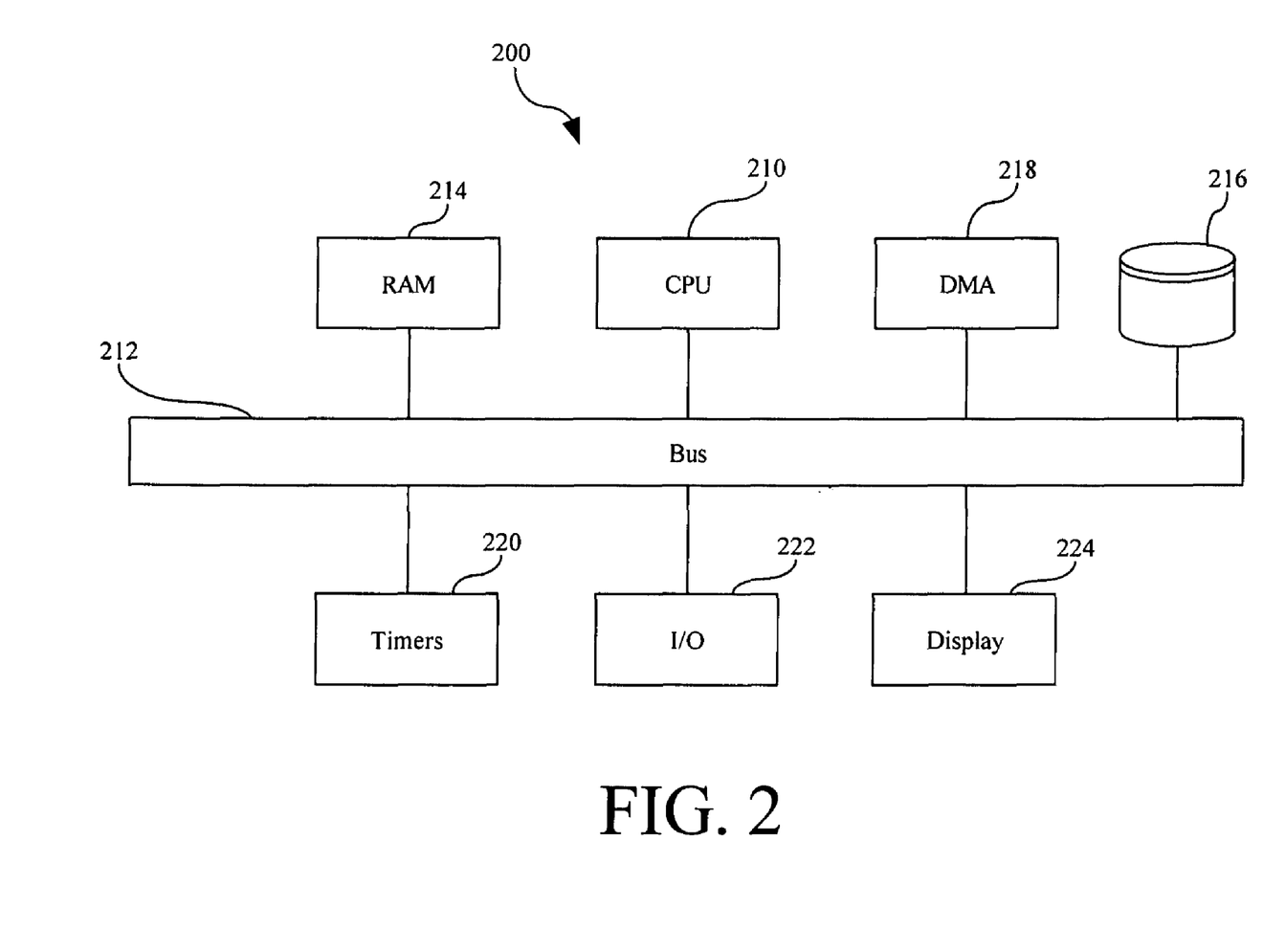
FIG. 2 is a block diagram of a test and measurement system 200 in accordance with an embodiment of the present invention.

FIG. 2 is a block diagram of a test and measurement system 200 in accordance with an embodiment of the present invention. The system 200 generally comprises: a CPU 210 connected by a bus 212 to: RAM 214; disk storage 216; DMA (direct memory access) controller 218; timers 220; I/O subsystem 222; and a display subsystem 224. It is to be noted that the block diagram shown in FIG. 2 has been simplified to avoid obscuring the present invention. There are functional components that have been left out or conveniently combined with other functional components selected for inclusion in FIG. 2. Further, the block diagram shown in FIG. 2 is but one of many architectures upon which the present invention may be practiced. The architecture show in FIG. 1 is typical of an embedded system and is sometimes termed the "PC architecture" because it resembles the architecture of an early personal computer. This architecture was chosen for describing the present invention, as it is universally recognizable to those of ordinary skill in the test and measurement field.

Figure 3:
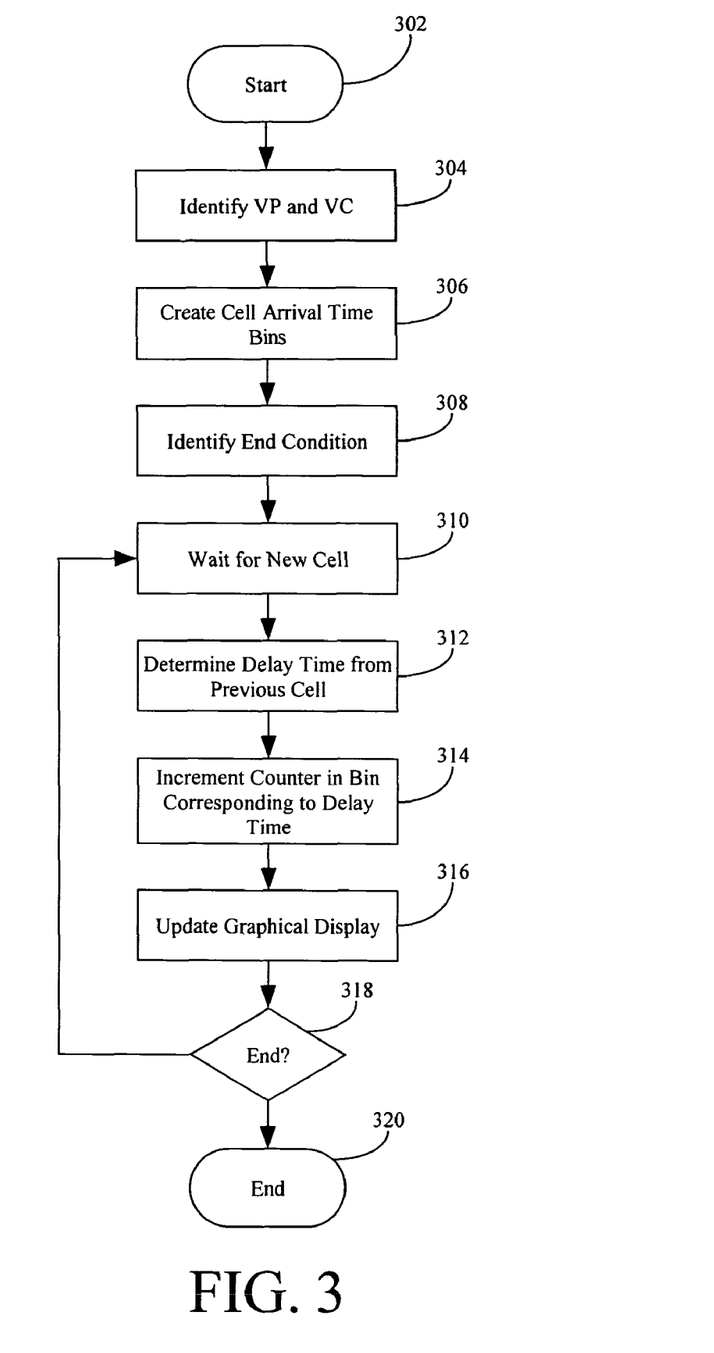
FIG. 3 is a flow chart of a method in accordance with an embodiment of the present invention.

FIG. 3 is a flow chart of a method in accordance with an embodiment of the present invention. In accordance with at least one embodiment of the present invention, the tester A is enhanced with any software, hardware, firmware, or any combination thereof to provide a graphical representation of intra-cell delay times across a network, such as an ATM network. In accordance with an embodiment of the present invention, the delay times between cells are measured. Counters are created to hold the number of times a particular time delay (delta) or range of time delays occurs. As each delta is measured, the respective counter, which represents the interval into which the delta falls, is increased. The contents of the counters is presented in graph form either in real-time or at preset intervals. In one embodiment, the resulting graph presents a histogram like display that, based on the pattern of peaks in the graph, represents the state of the traffic contract.

The method starts in step 302. In step 304 a virtual path and connection are specified. Next in step 306, memory locations, termed cell arrival time bins, are established to store counters for cell arrival times. The number of cell arrival time bins is determined along with the range of delta time values represented by each bin.

In perhaps the preferred embodiment, the delta time values for each cell arrival time bin is based on a multiple of the minimum arrival time. The minimum arrival time is a function of the ATM Maximum Cell Rate (MaxCR) for the specific ATM connection being measured. The minimum arrival time is calculated using 1/MaxCR. ATM cells only arrive in whole multiples of the MaxCR, such as MaxCR, MaxCR/2, MaxCR/3, etc . . .

The number of cell arrival time bins can be based on the multiple chosen for the delta time of each bin. Alternatively, the number of cell arrival time bins can be user selectable. Further, each cell arrival time bin can represent one or more arrival times depending on the granularity of the measurement desired. Once again this can be determined automatically or be based on user input. Next in step 308, an end condition is identified. The end condition can be set based on any number of conditions. For example, time, cells analyzed, receipt of a particular cell, or the occurrence of some identifiable network condition.

A loop is started in step 310 and comprises steps 310 through 318. In step 310 the method waits for a next cell. Once the next cell arrives, a delay time (delta) is calculated in step 312. In perhaps the preferred embodiment, the delta calculation is embodied in hardware, while the overall process, including the aforementioned counters and the hereinafter-described graphical display, is embodied in software (as executed by a processor). Thereafter, in step 314, the counter in the cell arrival time bin corresponding to the calculated delta time is incremented. In step 316, the graphical display is updated to reflect the new value. The content of the graphical display is discussed below, but generally takes the form of a histogram using bars or lines to represent the values of the counters in the cell arrival time bins. The loop shown in FIG. 3 describes a real-time update of the graphical display. Should a non-real-time display suffice, the update of the graphical display would be instigated at regular intervals or only after the entire test has been completed. In any event, the loop 310 through 314 (and 316 for real-time) is repeated until the end condition is detected in step 320 upon which, the method ends in step 320.

Figure 4:
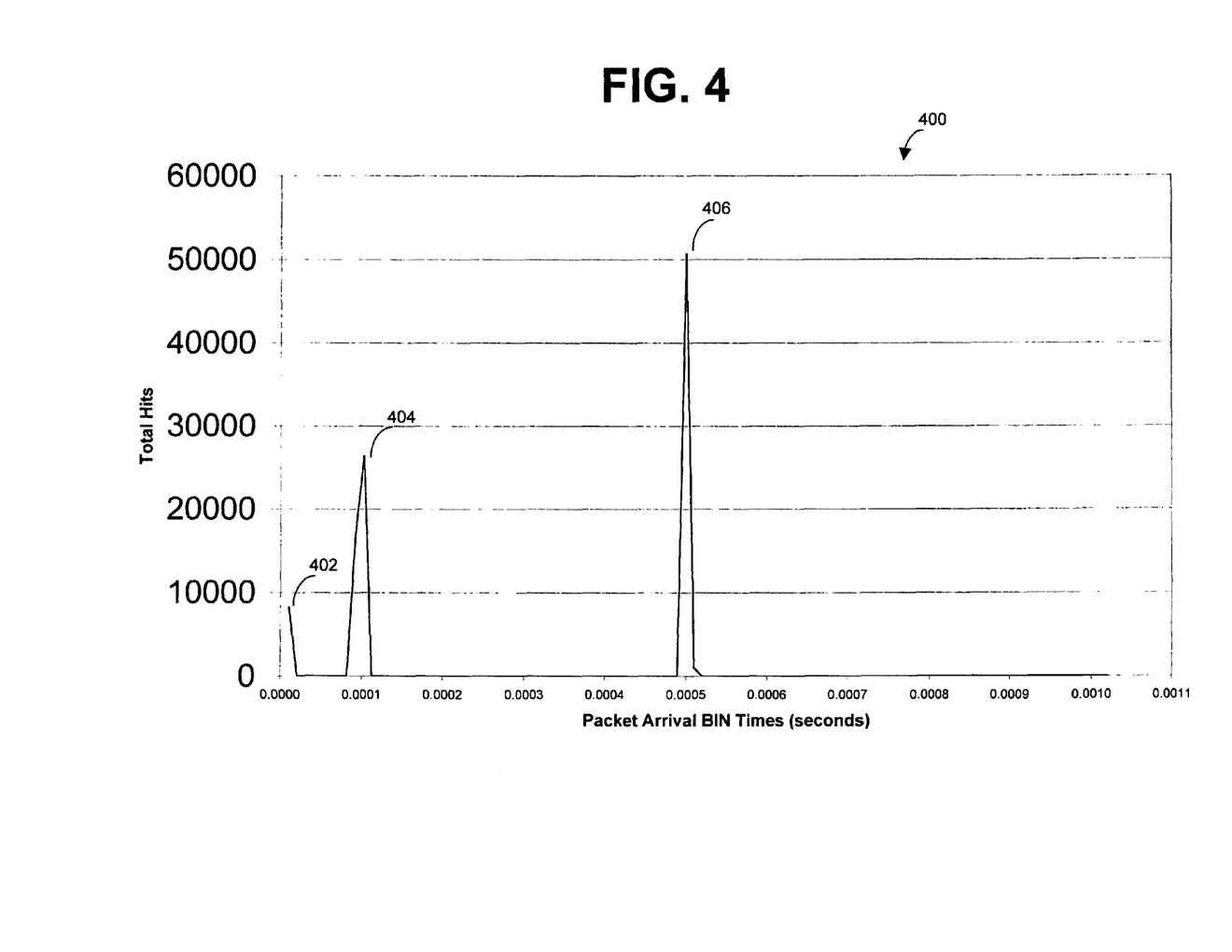
FIG. 4 is a graphical display produced in accordance with an embodiment of the present invention.

FIG. 4 is a graphical display 400 produced in accordance with an embodiment of the present invention. In particular, the graphical display 400 was produced based on analysis of a well-balanced VBR connection on an ATM network using the method described in FIG. 3. The graph 400 is similar to that of a spectrum analyzer but in the context of ATM packet-arrival frequency rather than a raw waveform. It has been discovered that such a graph is useful in revealing characteristics of traffic shaping for both CBT and VBR connections that were heretofore hidden from the users of known test systems. By analyzing the relative position of the peaks or the absence of a given peak an understanding of the nature of the traffic can be quickly gleaned.

As noted, the graph 400 in FIG. 4 portrays a healthy VBR connection on an ATM network. The initial rise for each graph represents data being transmitted at the MaxCR. This is associated with the first peak 402 on the graph 400. The second peak 404 indicates traffic levels at the Peak Cell Rate (PCR). The third peak 406 indicates cells being transmitted at the Sustained Cell Rate (SCR). Finally, the tail at the end of each cycle indicates a period where no cells are sent (or where cells are sent at a very low data rate). If present, this would show up as much smaller spikes to the right of the SRC peak 406.

Figure 5:
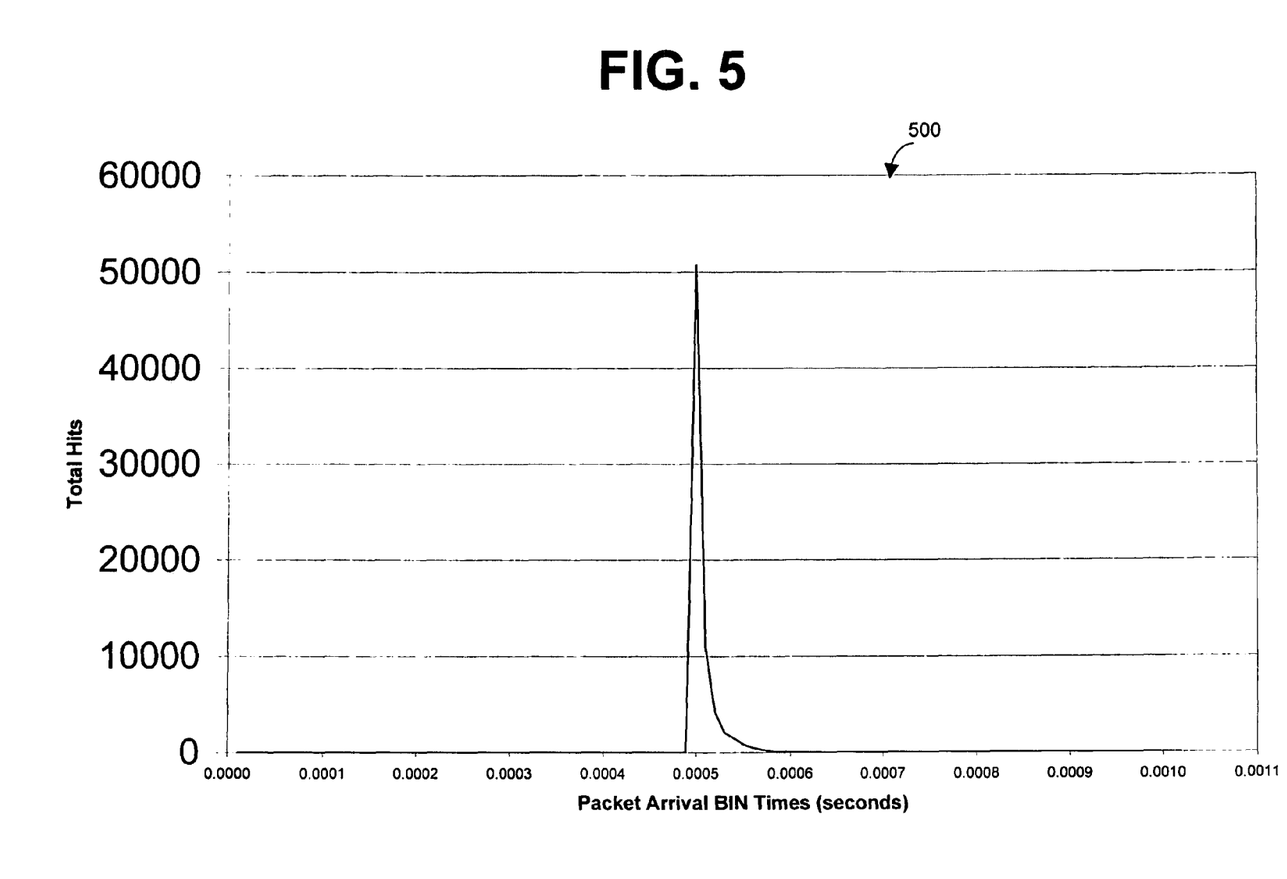
FIG. 5 is a graphical display produced in accordance with an embodiment of the present invention.

FIG. 5 is a graphical display 500 produced in accordance with an embodiment of the present invention. The graphical display 500 is an example of well-behaved CBR connection. In this case there is a single spike 502 centered around 0.0005 sec.

Figure 6:
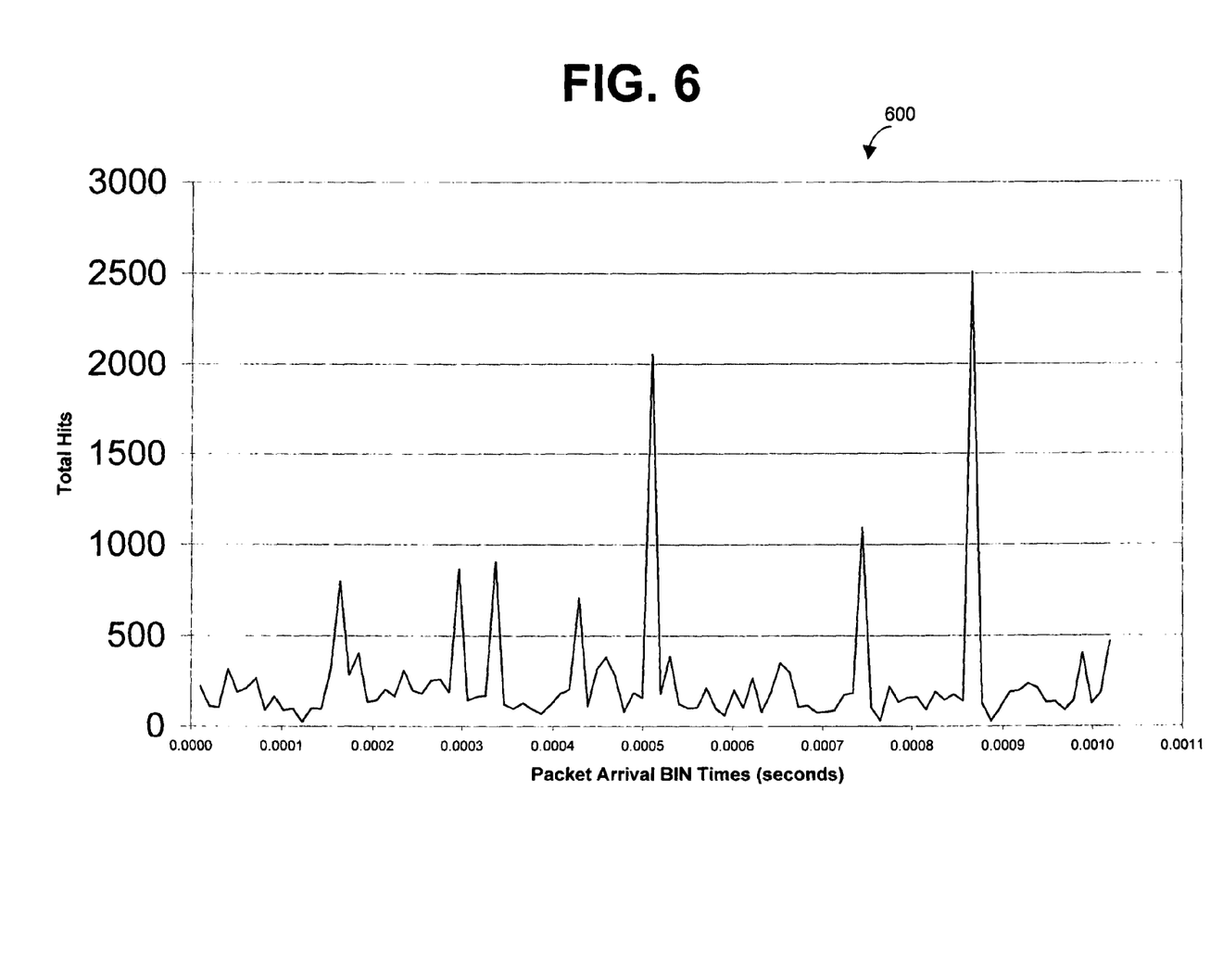
FIG. 6 is a graphical display produced in accordance with an embodiment of the present invention.

FIG. 6 is a graphical display 600 produced in accordance with an embodiment of the present invention. The graphical display 600 is an example of an unpoliced (or poorly policed) connection where the traffic is outside the negotiated parameters. The graphical display 600 basically indicates a random dispersal of cell arrival times with large spikes at 0.0005, 0.00075 and 0.00088 secs.

As can be seen, the present invention permits users to quickly gain an understanding of the state of a CBR or VBR connection. Inter-cell delay analysis quantifies the traffic in terms of PCR and SCR, making it possible to match the negotiated QoS to the traffic. This allows users to optimize QoS contracts so that they 1) get enough bandwidth or "quality of service" for their application and 2) avoid spending for excess bandwidth allocations that their application does not require.

Although an embodiment of the present invention has been shown and described, it will be appreciated by those skilled in the art that changes may be made in these embodiments without departing from the principles and spirit of the invention, the scope of which is defined in the claims and their equivalents.

What is claimed is:

1. A system for testing asynchronous transfer mode traffic, the system comprising:

an interface to connect to a network that carries asynchronous transfer mode traffic;

a processor configurable by software for conducting a test of the asynchronous transfer mode traffic on the network; and a memory storing instructions for causing the processor to control the system to execute an algorithm comprising:

specifying a particular asynchronous transfer mode (ATM) connection on the network;

establishing a plurality of counters, each of which counters is associated with a corresponding intra-cell delay time between receipt of a pair of consecutively-received ATM cells for the specified ATM connection and is configured to generate a count value indicating a number of occurrences of the corresponding intra-cell delay time;

receiving a plurality of new ATM cells for the specified ATM connection;

for each received new ATM cell for the specified ATM connection:

measuring an intra-cell delay between an arrival time of the new ATN cell and an arrival time of an immediately previously received ATM cell for the specified ATM connection, identifying one of the counters corresponding to the measured intra-cell delay time, and incrementing the identified counter; and displaying a graph indicating a distribution of the numbers of occurrences of the intra-cell delay times, based on the count values of the plurality of counters.

2. A method, comprising:

specifying an asynchronous transfer mode (ATM) connection;

establishing a plurality of counters, each of which counters is associated with a corresponding intra-cell delay time between receipt of a pair of consecutively-received ATM cells for the specified ATM connection, and each of which counters is configured to generate a count value indicating a number of occurrences of the corresponding intra-cell delay time;

receiving a plurality of new ATM cells for the specified ATM connection;

for each received new ATM cell for the specified ATM connection:

measuring an intra-cell delay between an arrival time of the new ATM cell and an arrival time of an immediately previously received ATM cell for the specified ATM connection, identifying one of the counters corresponding to the measured intra-cell delay time, and incrementing the identified counter; and displaying a graph indicating a distribution of the numbers of occurrences of the intra-cell delay times, based on the count values of the plurality of counters.

3. The method, as set forth in claim 2, further comprising: continuing the steps of measuring, identifying, and incrementing for a predetermined time period.

4. The method, as set forth in claim 2, further comprising: continuing the steps of measuring, identifying, and incrementing for a predetermined number of cells.

5. The system, as set forth in claim 1, wherein the instructions cause the processor to measure, identify, and increment for a predetermined virtual path and virtual channel for a predetermined time period.

6. The system, as set forth in claim 1, wherein the instructions cause the processor to measure, identify, and increment for a predetermined virtual path and virtual channel for a predetermined number of cells.

7. The system as set forth in claim 1, wherein each of the counters is further associated with a corresponding range of intra-cell delay times that includes the corresponding intra-cell delay time.

8. The method, as set forth in claim 2, further comprising: identifying a virtual path and virtual connection for the specified ATM connection.

9. The method of claim 2, wherein each of the counters is associated with a corresponding intra-cell delay time that is an integer multiple of an inverse of a Maximum Cell Rate (MCR) for the specified ATM connection.

10. The method of claim 2, wherein each of the counters is further associated with a corresponding range of intra-cell delay times that includes the corresponding intra-cell delay time.

11. A method, comprising:

specifying an asynchronous transfer mode (ATM) connection;

establishing a plurality of memory locations, each of which memory locations is associated with a corresponding intra-cell delay time between receipt of a pair of consecutively-received ATM cells for the specified ATM connection, and each of which memory locations stores a value indicating a number of occurrences of the corresponding intra-cell delay time;

receiving a plurality of new ATM cells for the specified ATM connection;

for each received new ATM cell for the specified ATM connection:

measuring an intra-cell delay between an arrival time of the new ATM cell and an arrival time of an immediately previously received ATM cell for the specified ATM connection, identifying one of the memory locations corresponding to the measured intra-cell delay time, and incrementing a value stored in the identified memory location; and displaying a graph indicating a distribution of the numbers of occurrences of the intra-cell delay times based on the values stored in the plurality of memory locations.

12. The method of claim 11, wherein each of the memory locations is associated with a corresponding intra-cell delay time that is an integer multiple of an inverse of a Maximum Cell Rate (MCR) for the specified ATM connection.

13. The method of claim 11, wherein each of the memory locations is further associated with a corresponding range of intra-cell delay times that includes the corresponding intra-cell delay time.

* * * * *